April 9, 1929.　　　　G. A. VAUGHN　　　　1,708,598
BOOM HOIST STRUCTURE FOR EXCAVATING MACHINES
Filed Sept. 30, 1926　　　2 Sheets-Sheet 1
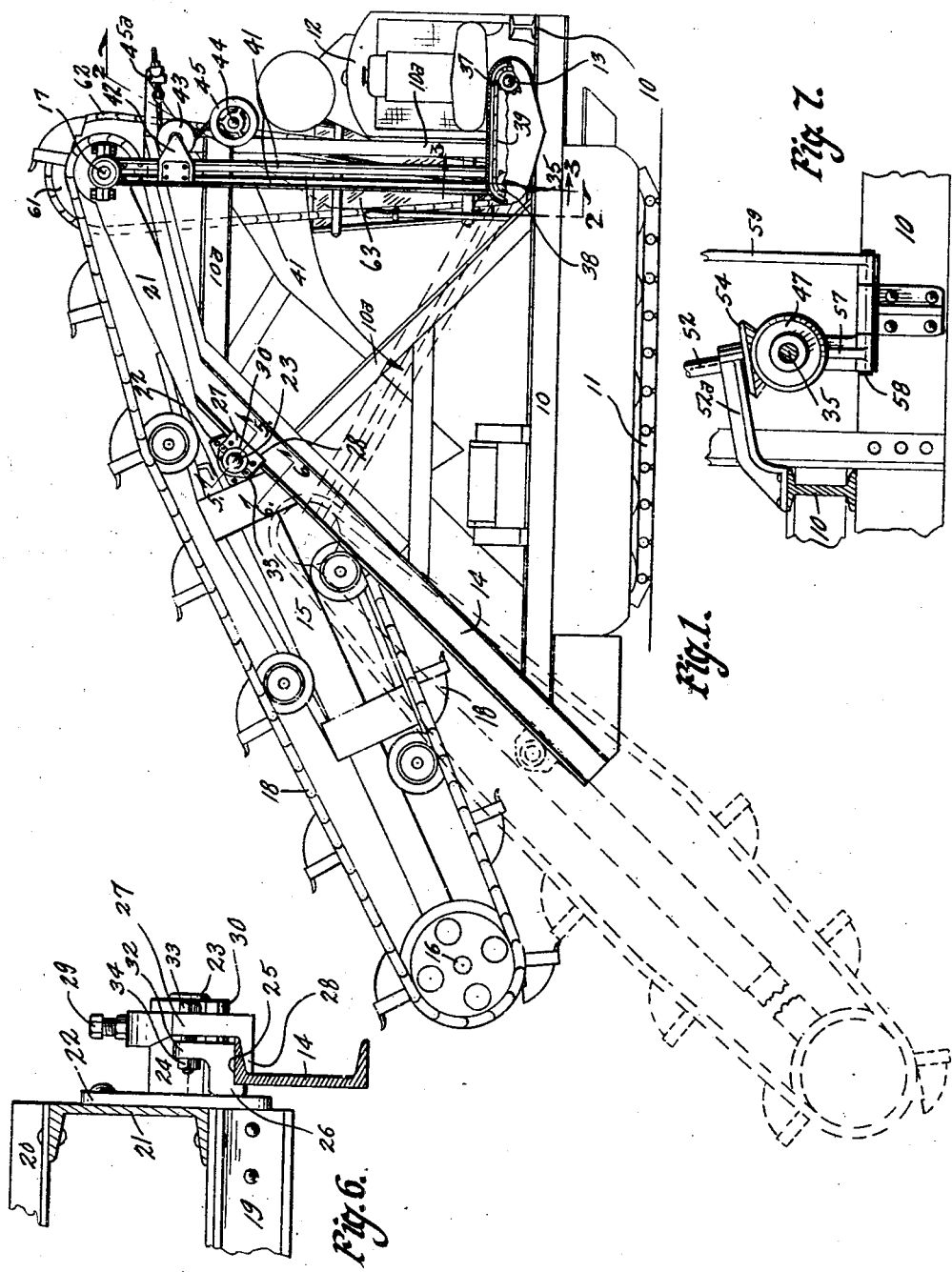
Witness
L. V. Sandberg
Inventor
George A. Vaughn
by Bair & Freeman Attorneys April 9, 1929.  G. A. VAUGHN  1,708,598
BOOM HOIST STRUCTURE FOR EXCAVATING MACHINES
Filed Sept. 30, 1926  2 Sheets-Sheet 2
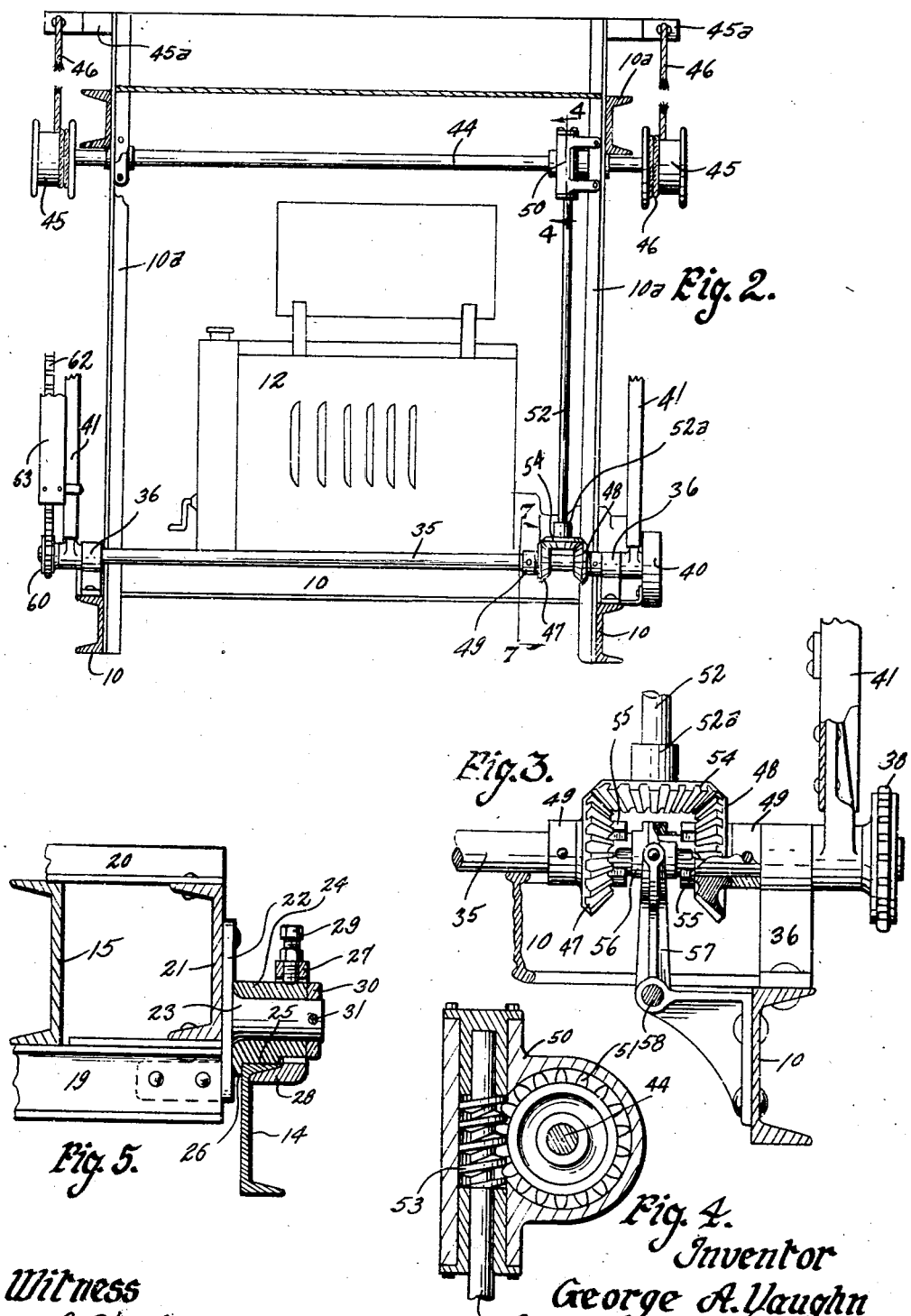

Patented Apr. 9, 1929.

1,708,598

UNITED STATES PATENT OFFICE.

GEORGE A. VAUGHN, OF NEWTON, IOWA, ASSIGNOR TO THE PARSONS COMPANY, OF NEWTON, IOWA.

BOOM-HOIST STRUCTURE FOR EXCAVATING MACHINES.

Application filed September 30, 1926. Serial No. 138,646.

The object of my invention is to provide a boom and boom hoist structure for excavating machines.

This structure is of simple, durable and inexpensive construction.

More particularly, it is my purpose to provide a boom hoist structure with a boom and operating mechanism having the parts so arranged and constructed that the boom may be easily and readily adjusted to position where it will be supported on the frame above the ground level or to a variety of positions projecting downwardly and rearwardly from the main frame, and will be rigidly supported in any of these positions.

A further object is to provide such a device having novel features of structure, whereby when the boom is raised from its lower position, it will likewise be tilted from the inclined position which it had when in use to a position more nearly horizontal, for thus relatively raising the lower end for transportation over the ground.

With these and other objects in view, my invention consists in the construction, arrangement and combination of the various parts of my boom hoist structure, whereby the objects contemplated are attained, as hereinafter more fully set forth, pointed out in my claims, and illustrated in the accompanying drawings, in which:

Figure 1 is a side elevation of an excavating machine equipped with a boom hoist structure embodying my invention.

Figure 2 is a detail, sectional view taken on the line 2—2 of Figure 1, certain details of the clutch structure being omitted.

Figure 3 is an enlarged, detail, sectional view illustrating the clutch structure and taken on the line 3—3 of Figure 1.

Figure 4 is a detail, sectional view taken on the line 4—4 of Figure 2.

Figure 5 is a detail, sectional view taken on the line 5—5 of Figure 1.

Figure 6 is a detail, sectional view taken on the line 6—6 of Figure 1; and

Figure 7 is a detail, sectional view taken on the line 7—7 of Figure 2.

In the accompanying drawings, I have used the reference character 10 to indicate generally the frame of a tractor forming part of an excavating machine and having the creeping tread structure 11.

At the front of the device is mounted the engine 12, having its shaft connected by suitable transmission gearing, not here shown, with a counter shaft 13.

The frame 10 has what may be called a superstructure 10$^a$.

At the rear of the main frame at the opposite sides thereof are supported parallel laterally spaced, outwardly opening channels 14 inclined from their lower ends upwardly and forwardly.

The excavating machine is provided at its rear portion with a boom indicated generally at 15 in Figure 1. The details of the boom structure are not herein described.

At the lower end of the boom is a transverse shaft 16 and at the upper end a transverse shaft 17. On the shafts just mentioned is the usual sprocket chain and bucket excavator mechanism 18.

The boom is mounted for lateral adjustment in a manner not particularly pertinent to the present device.

I provide between the ends of the boom a transverse I-beam 19 under the boom as shown in Figure 5, and above it a transverse angle bar 20 above the boom. The boom may slide between the I-beam 19 and the angle 20 laterally in the machine, and is thus moved by mechanism not herein particularly otherwise referred to.

The ends of the I-beam 19 and angle 20 are connected by a channel beam 21. The channel beam 21 and the boom holding and supporting I-beam 19 and angle bar 20 are supported for sliding adjustment and for limited rocking movement on the channels 14 in the following manner:

Secured to the channels 21 and preferably to the ends of the I-beam 19 at opposite sides of the device are plates 22 from which trunnions 23 project laterally. Journal sleeves 24 are mounted on the trunnions 23 and rest on top of the channels 14, as illustrated in Figure 5.

The lower surfaces of the journal sleeves 24 are flat, as at 25, to rest on the channels 14 and are preferably provided with shoulders 26 to fit the inner faces of the channels as shown in said figure.

On each of the journal sleeves 24 is mounted a plate 27, which has at its lower edge a flange 28 projecting under the upper flange of the channel 14.

Mounted in the upper part of the plate 27 above the journal sleeve 24 is a tightening and set screw 29, which may be tightened against the journal sleeve 24 for drawing the flange 28 snugly into engagement with the upper surface of the flange or channel 14.

On the end of each journal 24, a collar 30 is locked adjacent to the plate 27 by means of a pin 31.

The journal sleeve 24, as shown in Figure 6, is provided on each side with an ear 32. The ears 32 and the plate 27 in each instance are fastened together on opposite sides of the journal sleeve by means of bolts 33 and nuts 34.

By tightening the nuts 34 on the bolts 33, the boom can be locked to the channels 14. By loosening the nuts 34 or leaving them so that the parts are not too tightly, frictionally engaged, it will be seen that the boom can be slid up and down on the channels 14.

For accomplishing this raising and lowering of the boom, I provide the following means:

A transverse shaft 35, shown in Figures 1 and 2, is mounted on the lower part of the frame 10 in the bearings 36.

On the shafts 13 and 35 are sprockets 37 and 38 on which travels a sprocket chain 39, whereby motion is transmitted from the shaft 13 to the shaft 35. The gearing mechanism just described is covered by a gear casing 40.

On the shaft 35 near the ends thereof are mounted arms 41 extending upwardly in the machine and having the shafts 17 journaled in their upper ends. Supported on the arms 41 are brackets 42, which support pulleys 43. (See Figure 1.)

Mounted on the upper, forward part of the frame is a transverse shaft 44 on the ends of which are drums 45 (see Figures 1 and 2). Cables 46 are wound on the drums 45 extended around the pulleys 43 and secured to a bar or the like 45ª on the main frame of the machine.

It will be noted that the center of gravity of the boom is rearwardly and below the trunnions 23.

It will therefore be seen that by winding and unwinding the cables 46 on the drums 45, the boom may be raised or lowered.

I provide the following means for operating the shaft 44 and the drums 45.

On the shaft 35 are loosely mounted the spaced beveled gears or pinions 47 and 48, which are held against movement away from each other by collars 49 fixed on the shaft 35.

A bracket 50 is fixed on the main frame and has a shaft 44 journaled in it. On the shaft 44 in the bracket 50 is a worm wheel 51. The bracket 50 also serves as a gear casing.

A shaft 52 is journaled in the bracket 50 and has on it a worm 53 meshing with the worm wheel 51. On the lower end of the shaft 52 is a beveled pinion or gear 54, which meshes with the respective beveled gears 47 and 48.

Referring now to Figure 3, it will be observed that formed on the adjacent faces of the beveled gears 47 and 48 are clutch elements 55. A double-ended clutch member 56 is slidably but non-rotatably mounted on the shaft 35 between the gears 47 and 48.

A clutch actuating arm 57 is fixed on a short shaft 58 and is operatively connected with the clutch member 56 in the usual manner to permit the arm to slide the clutch element on the shaft and yet permit the clutch element to rotate with the shaft.

On the shaft 58 is a clutch actuating lever 59 by which the clutch just described is manipulated.

When the shaft 35 is being rotated from the engine, the lever 59 may be moved for actuating the clutch 56 operatively connecting the shaft 35 with either of the beveled gears 47 or 48 and thus rotating the shaft 52 in any desired direction.

The shaft 52 imparts rotation to the shaft 44 and the drums 45. When the shaft 44 is rotated in one direction from the shaft 52, the cables 46 are unwound from the drums 45 for allowing the boom to slide downwardly and rearwardly.

When the shaft 44 is operated for rotating it in the opposite direction, the drums 45 are rotated in the other direction for winding up the cables for raising the boom.

On the shaft 35 is a sprocket 60.

The lower end of the shaft 52 is journaled in a bracket 52ª supported on the main frame 10, as shown for example in Figure 7.

In the same vertical plane with the sprocket 60 is a sprocket 61 (Figure 1) fixed on the shaft 17.

A chain 62 (Figures 1 and 2) travels on the sprockets 60 and 61.

An enclosing case 63 for the greater part of the chain 62 is supported on one of the arms 41.

Motion is transmitted through the sprockets 60 and 61 and chain 62 from the shaft 35 to the shaft 17 for actuating the chain and bucket excavator mechanism.

It will be understood that I have not here attempted to describe any of the parts or mechanism of the excavating machinery, except those necessary for illustrating the construction and operation of the boom hoist device and connecting parts.

In the practical operation of the boom hoist, assuming that the parts are in the position shown in full lines in Figure 1 with the boom raised, it will be noted that by properly moving the clutch control lever 59, the shaft 58 will be rocked for swinging the arm 57 and thus throwing the clutch element 56 into inoperative engagement with one of the pinions 47 or 48 on the shaft 35.

Rotation of the shaft 35 will thus be imparted to the pinion gear 54 and the shaft 52.

Rotation of the shaft 52 is imparted through the worm 53 and worm wheel 51 to the shaft 44. (See Figure 4.)

Rotation of the shaft 44 (Figures 1 and 2) will then rotate the drums 45 for instance for unwinding the cables 46, and if the boom is not locked on the channels 14, its weight will cause it to slide down the channels.

Since the trunnions 23 move in straight lines parallel with the channels 14 and the shaft 17 moves in the arc of a circle having its center at the center of the shaft 35, the boom will not only slide downwardly but will be given a tilting movement, whereby its rear end is relatively lowered until the boom comes more nearly into parallel with the channels 14.

When the boom has been lowered to the position for digging, the excavating operation is commenced and the boom can be lowered into the ground as the ditch is made, as far as is desired, the lowering movement being, of course, limited by the capacity of the machine.

After the ditch has been started, the boom may, if desired, and if the nature of the ground being excavated requires it, be locked to the channels 14 on the main frame by tightening the nuts 34 on the bolts 33. (See Figure 6.)

When it is desired to raise the boom out of the ground for moving the excavator to some other location, the boom is unlocked from the channels 14, if it has been so locked, and the boom hoisting mechanism is put in operation by proper manipulation of the lever 59 for winding the cables 46 on the drums 45 and pulling the boom upwardly.

Insomuch as the trunnions 23 travel upwardly along the inclined channel beams 14, whereas the shaft 17 travels on the arc of the circle aforesaid, it will be noted that as the boom approaches its upward limit of movement, it is tilted so as to lift its rear end away from the ground. This makes it possible to raise and lower the boom with a minimum of movement.

It also makes possible a convenient method of operating the chain and bucket excavating mechanism from the shaft at the upper edge of the boom, which is always the same distance from the shaft 35.

It also accomplishes another important function.

In excavating machinery of this type in which the boom is mounted at the rear of the main frame and is raised or lowered, some difficulty is encountered due to the fact that the boom imposes a great weight at one end of the machine, so that it is sometimes difficult to prevent the machine from tipping over, as for instance in climbing a hill.

With my device, the tilting movement of the boom puts the center of gravity of the boom more nearly over the center of the base formed by the main frame and the traction means, such as the endless tread device 11, and thus reduces the danger of upsetting the machine.

The mechanism for hoisting and lowering the boom is of comparatively simple construction and in the machines in operation has been found durable and effective.

Changes may be made in the details of the construction and arrangement of my improved boom hoisting structure, and it is my purpose to cover by the claims which may be allowed to me and become a part of the patent to be issued upon this application any modified forms of structure or arrangement of parts, which may be included within the scope of such claims and of my real invention.

I claim as my invention:

1. In a device of the class described, an excavating machine frame having at one end fixed parallel inclined supporting beams, a boom mounted off-center from end to end for sliding and pivotal movement on said beams, arms pivoted to the main frame and pivoted to one end of the boom, a drum structure mounted on the main frame, cable means wound on the drum structure and secured at one end to the main frame, said boom and arm device having pulley means through which said cable means coact.

2. In a device of the class described, an excavating machine frame having at one end parallel inclined supporting beams, a boom mounted off-center from end to end for sliding and pivotal movement on said beams, arms pivoted to the main frame and pivoted to one end of the boom, a drum structure mounted on the main frame, cable means wound on the drum structure and secured at one end to the main frame, said boom and arm device having pulley means through which said cable means coact, and excavating mechanism on said boom, a power shaft having its longitudinal axis in line with the pivot axes of the arms on the main frame, and means for operating said drum structure and excavating mechanism from said shaft.

3. In a structure of the class described, a main frame, parallel inclined supporting beams at one end thereof, a boom mounted on said beams for sliding and pivotal movement for permitting the boom to be raised and lowered into and out of the ground over which the main frame has traveled, a power shaft supported on the main frame, a pair of arms pivoted to the main frame in line with the axis of said shaft, and pivotally connected with the upper end of the boom, and means for rocking said arms for imparting sliding and tilting movement to the boom.

4. In a structure of the class described, a main frame, parallel inclined supporting beams at one end thereof, a boom mounted off-center longitudinally on said beams for sliding and pivotal movement for permitting the boom to be raised and lowered into and out of the ground over which the main frame has traveled, a power shaft supported on the main frame, a pair of arms pivoted to the main frame in line with the axis of said shaft, and pivotally connected with the upper end of the boom, means for rocking said arms for imparting sliding and tilting movement to the boom, drums on the main frame, pulleys on the said boom and arm structure, cables wound on said drums and extended through said pulleys and secured to the main frame, means for actuating said drums from said shaft, an excavating mechanism carried by said boom, and means for operating said excavating mechanism from said shaft.

5. In a device of the class described, spaced parallel beams having flanges, a boom, means for mounting the boom on the beams for sliding and pivotal movement, comprising trunnions connected with the boom, journal sleeves on the trunnions resting on the beams for sliding movement and having shoulders for engaging one side of said beams, plates mounted on said journal sleeves having flanges underhanging the above-described flanges on said beams, and means for drawing said flanges of said plates into snug engagement with the flanges of said beams.

6. In a device of the class described, spaced parallel beams having flanges, a boom, means for mounting the boom on the beams for sliding and pivotal movement, comprising trunnions connected with the boom, journal sleeves on the trunnions resting on the beams for sliding movement and having shoulders for engaging one side of said beams, plates mounted on said journal sleeves having flanges underhanging the above-described flanges on said beams, and means for drawing said flanges of said plates into snug engagement with the flanges of said beams in two directions.

7. In a device of the class described, spaced parallel beams having flanges, a boom, means for mounting the boom on the beams for sliding and pivotal movement, comprising trunnions connected with the boom, journal sleeves on the trunnions resting on the beams for sliding movement and having shoulders for engaging one side of said beams, plates mounted on said journal sleeves having flanges underhanging the above-described flanges on said beams, and means for drawing said flanges of said plates into snug engagement with the flanges of said beams in two directions, said last means being adjustable so that the operation thereof in different directions may be relatively controlled.

8. In a device of the class described, a frame, a pair of beams at the rear end thereof inclined from their lower ends upwardly and forwardly, a boom, means for mounting said boom off center on said beams for sliding and pivotal movement thereon, a pair of arms pivoted on the forward portion of said frame, a transverse shaft at the upper end of said boom, said arms being pivoted on said shaft, and means for actuating said arms whereby when the boom is slid on said beams by the swinging movement of said arms it will also be tilted to different angles.

9. In a device of the class described, a frame, a pair of beams at the rear end thereof inclined from their lower ends upwardly and forwardly, a boom, means for mounting said boom off center on said beams for sliding and pivotal movement thereon, said means comprising trunnions projecting from the boom, journals for the trunnions slidably mounted on the beams, and means for detachably locking the journals to the beams, a pair of arms pivoted on the forward portion of said frame, a transverse shaft at the upper end of said boom, said arms being pivoted on said shaft, and means for actuating said arms whereby when the boom is slid on said beams by the swinging movement of said arms it will also be tilted to different angles.

10. In a machine of the class described, the combination of a frame, a power plant supported on one end of said frame, spaced beams on the other end of said frame inclined from the end of the frame upwardly and forwardly, a boom pivotally and slidably mounted on said inclined beams, a shaft 35, and means actuated from the power plant for swinging the upper end of the boom in a limited arc around the axis of said shaft for thus tilting and sliding the boom, said means including arms pivoted at one end axially of said shaft and at the other end to said boom near one end thereof.

11. In a machine of the class described, the combination of a frame, a power plant supported on one end of said frame, spaced beams on the other end of said frame inclined from the end of the frame upwardly and forwardly, a boom pivotally and slidably mounted on said inclined beams, a shaft 35, and means actuated from the power plant for swinging the upper end of the boom in a limited arc around the axis of said shaft for thus tilting and sliding the boom, said means including arms pivoted at one end axially of said shaft and at the other end to said boom near one end thereof, a worm gear structure adapted to automatically lock the boom in any of its raised positions against lowering movement.

12. In a device of the class described, the combination of a supporting frame having a power plant in one end thereof, a boom mounted on the other end of said frame for sliding movement in an inclined plane and for pivotal movement in a vertical plane, a shaft 44, a drum and cable mechanism for connecting said shaft with the upper end of the boom, a shaft 35, a shaft 52, a reverse gear mechanism for operatively connecting the shafts 35 and 52, and a worm and worm wheel, means for transmitting motion from the shaft 52 to the shaft 44, whereby the shaft 44 may be rotated in either direction and will be automatically locked when the shaft 52 is not in motion.

13. In a device of the class described, the combination of a supporting frame having a power plant in one end thereof, a boom mounted on the other end of said frame for sliding movement in an inclined plane and for pivotal movement in a vertical plane, a shaft 44, a drum and cable mechanism for connecting said shaft with the upper end of the boom, a shaft 35, a shaft 52, a reverse gear mechanism for operatively connecting the shafts 35 and 52, and a worm and worm wheel, means for transmitting motion from the shaft 52 to the shaft 44, whereby the shaft 44 may be rotated in either direction and will be automatically locked when the shaft 52 is not in motion, and means for maintaining a transverse axis through the upper end of the boom parallel with the shaft 35 in all sliding and pivotal positions of the boom.

14. In a structure of the class described, the combination of a tractor having a frame having a power plant supported on one end of said frame, a boom mounted at the other end of the frame for sliding movement in an inclined plane and for pivotal movement in a vertical plane, the pivotal axis of said boom being above its center of gravity from end to end, a shaft operatively connected with the power plant, and means for swinging the upper end of said boom around the axis of said shaft, excavating mechanism on the boom, whereby the boom may be raised and lowered and tilted by power from the power plant and when the boom is in operating position the excavating mechanism will be crowded against the work.

15. In a structure of the class described, a main frame, parallel inclined supporting beams at one end thereof, a boom mounted off-center on said beams for sliding and pivotal movement for permitting the boom to be raised and lowered into and out of the ground over which the main frame has traveled, a power shaft supported on the main frame, a pair of arms pivoted to the main frame in line with the axis of said shaft, and pivotally connected with the upper end of the boom, and means for simultaneously sliding said boom and swinging said arms.

Des Moines, Iowa, January 13, 1926.

GEORGE A. VAUGHN.